US010955927B2

(12) United States Patent
Ueno et al.

(10) Patent No.: US 10,955,927 B2
(45) Date of Patent: Mar. 23, 2021

(54) ELECTRONIC DEVICE, PROGRAM, AND CONTROL METHOD

(71) Applicant: KYOCERA Corporation, Kyoto (JP)

(72) Inventors: Yasuhiro Ueno, Yokohama (JP); Shigeki Tanabe, Yokohama (JP); Hideki Morita, Yokohama (JP); Isao Masuike, Machida (JP); Koutaro Yamauchi, Yokohama (JP); Manabu Sakuma, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/349,727

(22) PCT Filed: Nov. 8, 2017

(86) PCT No.: PCT/JP2017/040306
§ 371 (c)(1),
(2) Date: May 14, 2019

(87) PCT Pub. No.: WO2018/092658
PCT Pub. Date: May 24, 2018

(65) Prior Publication Data
US 2019/0354190 A1 Nov. 21, 2019

(30) Foreign Application Priority Data
Nov. 15, 2016 (JP) .............................. JP2016-222612

(51) Int. Cl.
*G06F 3/01* (2006.01)
*G06F 40/279* (2020.01)

(52) U.S. Cl.
CPC ............ *G06F 3/017* (2013.01); *G06F 40/279* (2020.01)

(58) Field of Classification Search
CPC ...... G06F 3/017; G06F 40/279; G06F 3/0488; G06F 3/14
See application file for complete search history.

(56) References Cited

U.S. PATENT DOCUMENTS

| 10,037,083 B2 | 7/2018 | Nii | |
| 2009/0193348 A1* | 7/2009 | Banks | G06F 3/04883 715/764 |
| 2009/0307595 A1* | 12/2009 | Clark | G06T 13/40 715/728 |
| 2010/0162182 A1* | 6/2010 | Oh | G06F 3/017 715/863 |
| 2010/0294938 A1 | 11/2010 | Alameh et al. | |

(Continued)

FOREIGN PATENT DOCUMENTS

JP 2015-225493 A 12/2015
WO 2015/060856 A1 4/2015

*Primary Examiner* — Premal R Patel
(74) *Attorney, Agent, or Firm* — Studebaker & Brackett PC

(57) ABSTRACT

An electronic device includes a proximity sensor, a storage that links and stores keywords with types of gestures detected by the proximity sensor, and a controller that detects a keyword from notification information provided to a user and executes processing based on the type of gesture linked to the keyword. The electronic device may also include a communication interface, and the notification information may include information received by the communication interface. The electronic device may also include a display, and the notification information may include information displayed on the display.

19 Claims, 5 Drawing Sheets

(56) References Cited

U.S. PATENT DOCUMENTS

| | | | |
|---|---|---|---|
| 2014/0304651 A1* | 10/2014 | Johansson | G06F 3/0482 |
| | | | 715/810 |
| 2015/0346831 A1 | 12/2015 | Nii | |
| 2016/0239202 A1 | 8/2016 | Lee et al. | |
| 2016/0284436 A1* | 9/2016 | Fukuhara | H01B 7/04 |
| 2016/0299570 A1* | 10/2016 | Davydov | G06F 3/167 |
| 2018/0083913 A1* | 3/2018 | Ganesh | H04L 51/24 |

\* cited by examiner

FIG. 4

| Group number | Keywords | Notification information type | Priority | Gesture-based processing | | | |
|---|---|---|---|---|---|---|---|
| | | | | Up-down movement | Left-right movement | Trace a triangle | Trace a rectangle |
| 1 | Going home | Message | 3 | Display route | Shopping request | Cancel selection | Return to recipe display |
| 2 | 17:40 (pickup time) | Current time | 5 | Display route | Contact | Cancel selection | Return to recipe display |
| 3 | 8000 (target number of steps) | Number of steps | 1 | Launch application | Display calorie consumption | Cancel selection | Return to recipe display |
| 4 | Breaking, extra | News | 2 | Display body | Read aloud | Cancel selection | Return to recipe display |
| 5 | Watch, warning | Weather forecast | 4 | Display forecast | Read aloud | Cancel selection | Return to recipe display |
| ......... | ......... | ......... | ......... | ......... | ......... | ......... | ......... |

111

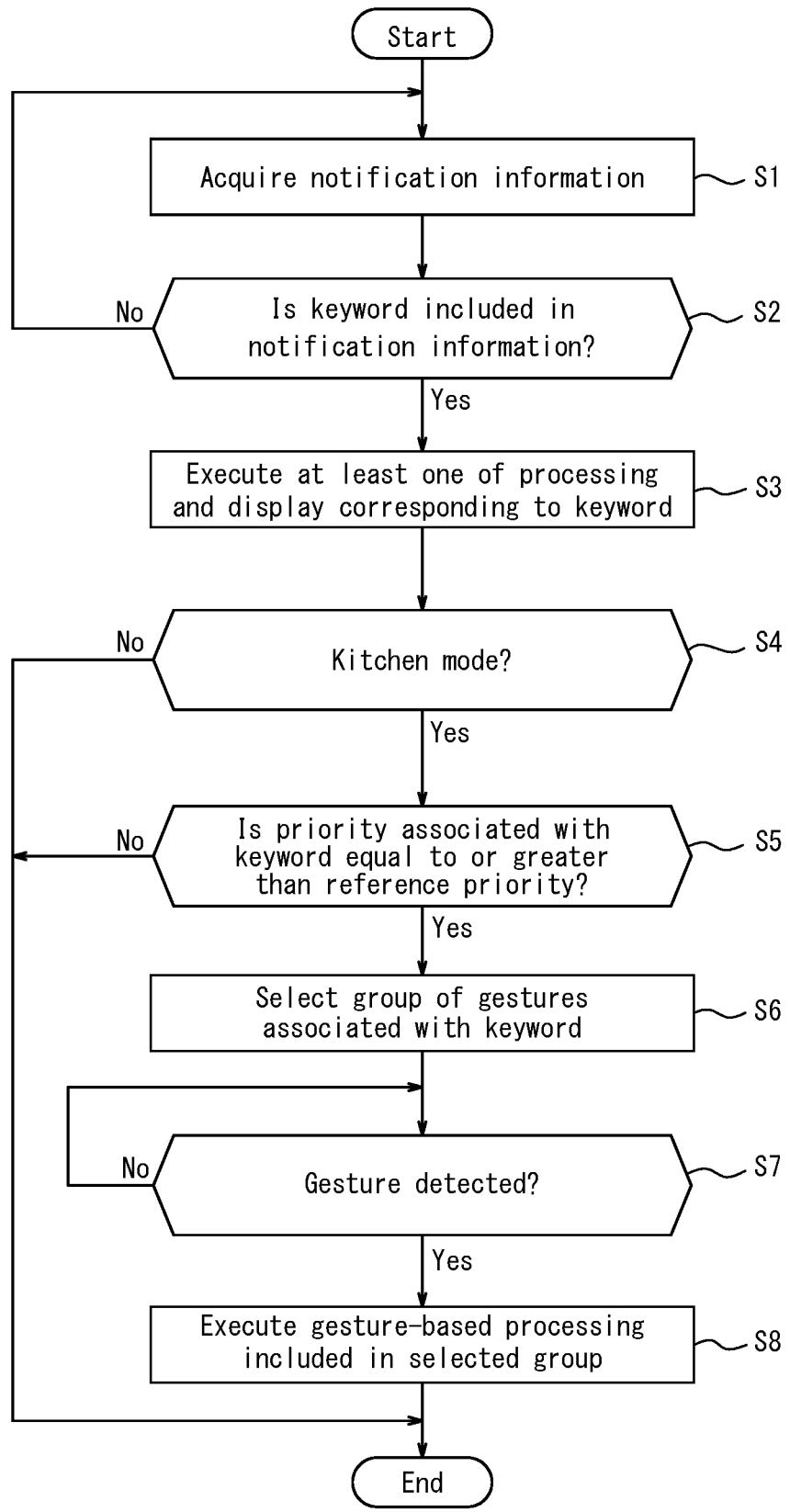

ELECTRONIC DEVICE, PROGRAM, AND CONTROL METHOD

CROSS-REFERENCE TO RELATED APPLICATION

The present application claims priority to and the benefit of Japanese Patent Application No. 2016-222612 filed Nov. 15, 2016, the entire contents of which are incorporated herein by reference.

TECHNICAL FIELD

The present disclosure relates to an electronic device, a program, and a control method.

BACKGROUND

Electronic devices, such as smartphones and tablets, typically include a touch panel. A user typically controls such an electronic device by touching the touch panel. A recently developed electronic device detects a gesture, performed by the user at a distance from a terminal, using a proximity sensor such as an infrared sensor and then processes an input operation corresponding to the gesture.

SUMMARY

An electronic device according to an embodiment of the present disclosure includes a proximity sensor, a storage configured to link and store a keyword with a type of gesture detected by the proximity sensor, and a controller configured to detect the keyword from notification information provided to a user and to execute processing based on the type of gesture linked to the keyword.

A program according to an embodiment of the present disclosure is for an electronic device that includes a proximity sensor and a storage configured to link and store a keyword with a type of gesture detected by the proximity sensor. The program causes the electronic device to detect the keyword from notification information provided to a user. The program causes the electronic device to execute processing based on the type of gesture linked to the keyword.

A control method according to an embodiment of the present disclosure is a control method of an electronic device that includes a proximity sensor and a storage configured to link and store a keyword with a type of gesture detected by the proximity sensor. The control method includes detecting the keyword from notification information provided to a user. The control method includes executing processing based on the type of gesture linked to the keyword.

BRIEF DESCRIPTION OF THE DRAWINGS

In the accompanying drawings:

FIG. 4 illustrates an example of gesture group information stored in a storage; and FIG. 5 is a flowchart illustrating an example of processing executed by an electronic device according to an embodiment of the present disclosure.

DETAILED DESCRIPTION

Electronic Device Configuration

Figure 1:
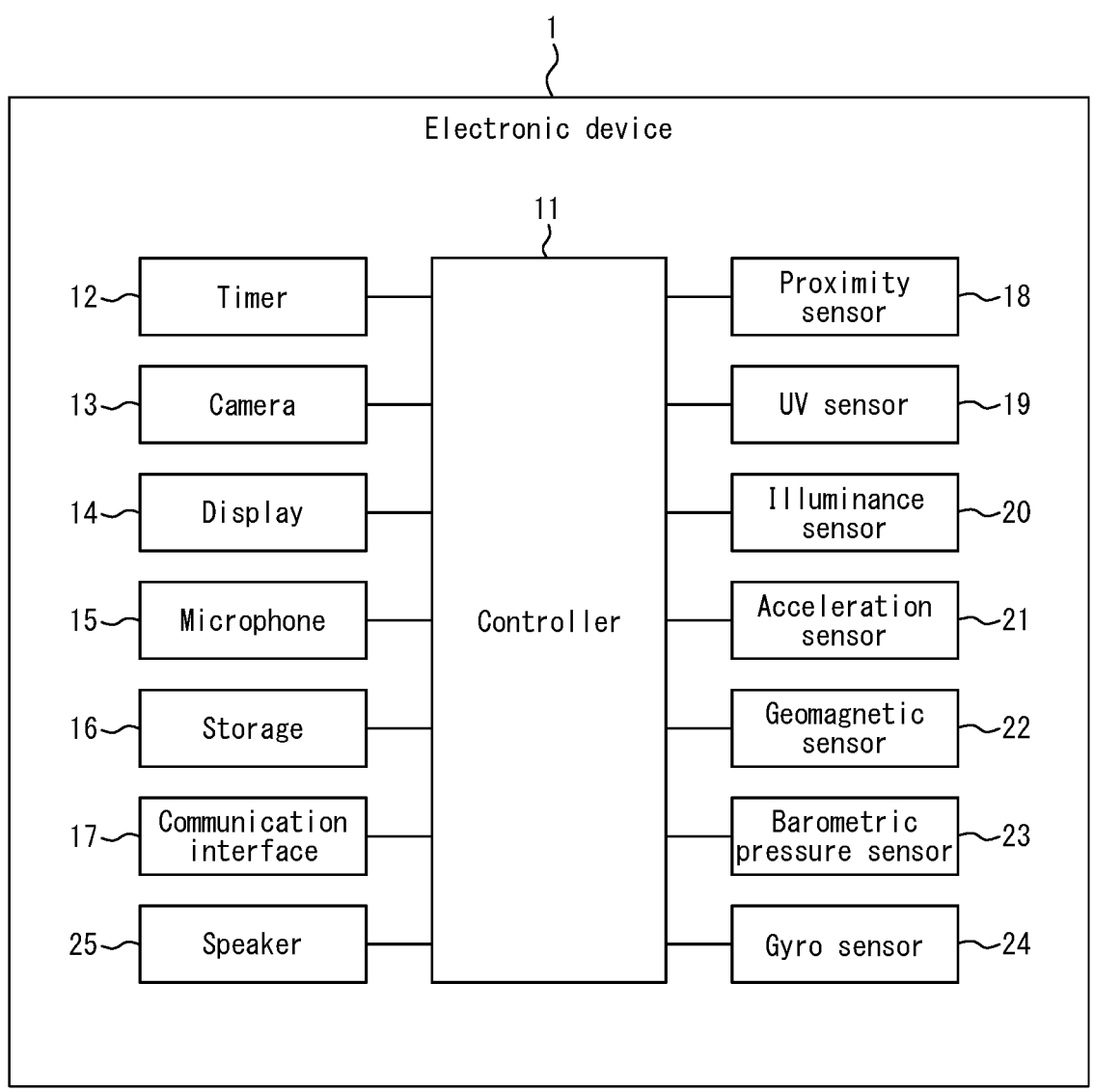
FIG. 1 is a schematic diagram of an electronic device according to an embodiment of the present disclosure.

As illustrated in FIG. 1, an electronic device 1 of an embodiment includes a display 14, a storage 16, a communication interface 17, a proximity sensor 18 (gesture sensor), and a controller 11. The electronic device 1 further includes a timer 12, a camera 13, a microphone 15, a UV sensor 19, an illuminance sensor 20, an acceleration sensor 21, a geomagnetic sensor 22, a barometric pressure sensor 23, a gyro sensor 24, and a speaker 25. FIG. 1 is only an example, and the electronic device 1 need not include all of the components in FIG. 1. Also, the electronic device 1 may include components other than those illustrated in FIG. 1.

The display 14 displays a screen. The screen includes, for example, at least one of characters, images, symbols, graphics, and the like. The display 14 may be a liquid crystal display (LCD), an organic electro-luminescence (EL) panel, an inorganic EL panel, or the like. In the present embodiment, the display 14 is a touchscreen display. The touchscreen display detects contact by a finger, a stylus, or other object and identifies the contact position. The display 14 can simultaneously detect a plurality of positions contacted by fingers, styli, or other objects.

The storage 16 functions as a memory storing programs and data. The storage 16 temporarily stores the processing results of the controller 11. The storage 16 may include any appropriate storage device, such as a semiconductor storage device or a magnetic storage device. The storage 16 may also include a plurality of types of storage devices. The storage 16 may include a combination of a portable storage medium, such as a memory card, and an apparatus for reading the storage medium.

The programs stored in the storage 16 include applications that run in the foreground or the background and a control program that supports operations of the applications. For example, the applications cause the controller 11 to execute processing corresponding to a gesture. The control program is, for example, an operating system (OS). The applications and control program may be installed on the storage 16 by communication through the communication interface 17 or from a storage medium.

The communication interface 17 is for communicating over a wired or wireless connection. The communication method of the communication interface 17 in an embodiment is prescribed by a wireless communication standard. For example, a cellular phone communication standard such as 2G, 3G, or 4G may be used as the wireless communication standard. Examples of cellular phone communication standards include Long Term Evolution (LTE), Wideband Code Division Multiple Access (W-CDMA), CDMA2000, Personal Digital Cellular (PDC), Global System for Mobile Communications (GSM® (GSM is a registered trademark in Japan, other countries, or both)), and Personal Handy-phone System (PHS). Examples of wireless communication standards include Worldwide Interoperability for Microwave Access (WiMAX), IEEE 802.11, Bluetooth® (Bluetooth is a registered trademark in Japan, other countries, or both), Infrared Data Association (IrDA), and Near Field Communication (NFC). The communication interface 17 may support one or more of the aforementioned communication standards.

Without contact, the proximity sensor 18 detects the relative distance to an object near the electronic device 1, the movement direction of the object, and the like. The proximity sensor 18 in an embodiment includes four visible light photodiodes that can detect white, red, green, and blue. The proximity sensor 18 can measure the relative distance from the object. The proximity sensor 18 also includes one infrared light emitting diode (LED) serving as a light source and four infrared photodiodes that detect the up, down, left, and right directions. The proximity sensor 18 emits infrared light, from the infrared LED serving as a light source, onto an object. The proximity sensor 18 detects the movement direction of the object by the difference in time at which reflected light from the object is incident on each of the infrared photodiodes. The proximity sensor 18 can thus detect an operation by an air gesture (gesture) that the user of the electronic device 1 performs without touching the electronic device 1.

The controller 11 is a processor such as a central processing unit (CPU). The controller 11 may be a system-on-a-chip (SoC) or other type of integrated circuit in which other components are integrated. The controller 11 may be configured by combining a plurality of integrated circuits. The controller 11 implements a variety of functions by controlling overall operation of the electronic device 1.

Specifically, the controller 11 refers as necessary to data stored in the storage 16. The controller 11 implements a variety of functions by executing instructions included in programs stored in the storage 16 to control other functional components, such as the display 14. For example, the controller 11 acquires data indicating contact by the user from the touch panel. The controller 11 also acquires a portion or all of the data detected by the UV sensor 19, the illuminance sensor 20, the acceleration sensor 21, the geomagnetic sensor 22, the barometric pressure sensor 23, and the gyro sensor 24. The controller 11 recognizes the usage conditions of the storage 16. The controller 11 also recognizes the launch status of applications.

The timer 12 receives an instruction for a timer operation from the controller 11. Once a predetermined time has elapsed, the timer 12 outputs a signal indicating that the predetermined time has elapsed to the controller 11. The timer 12 may be provided external to the controller 11, as illustrated in FIG. 1. The timer 12 may instead be provided internally within the controller 11.

The camera 13 captures images of subjects around the electronic device 1. One example of the camera 13 is a front camera provided on the same face as the display 14 of the electronic device 1.

The microphone 15 detects sound around the electronic device 1, including people's voices.

The speaker 25 outputs sound. When, for example, the news, the weather forecast, or the like is read aloud, the speaker 25 outputs the corresponding sound.

The UV sensor 19 can measure the amount of ultraviolet light included in sunlight or other light.

The illuminance sensor 20 detects the illuminance from surrounding light that is incident on the illuminance sensor 20.

The acceleration sensor 21 detects the direction and magnitude of acceleration acting on the electronic device 1. The acceleration sensor 21 is a three-axis (3D) type of sensor that detects acceleration in the x-axis, y-axis, and z-axis directions. The acceleration sensor 21 may be of any type. The acceleration sensor 21 may, for example, be a piezoresistive type. Alternatively, the acceleration sensor 21 may be a capacitive type. The acceleration sensor 21 may also, for example, be a piezoelectric element (piezoelectric type) or a thermal detection type of microelectromechanical system (MEMS). The acceleration sensor 21 may also, for example, be a servo-type of sensor that moves a moveable coil and returns the coil by feedback current. Furthermore, the acceleration sensor 21 may be a strain-gauge type of sensor that uses a strain gauge to measure strain generated by acceleration.

The geomagnetic sensor 22 detects the orientation of the earth's magnetism. For example, the orientation information acquired by the geomagnetic sensor 22 may be the component when the orientation of the electronic device 1 is projected onto a plane parallel to the ground. The orientation information acquired by the geomagnetic sensor 22 is the direction of the electronic device 1.

The barometric pressure sensor 23 detects the barometric pressure (atmospheric pressure) outside of the electronic device 1.

The gyro sensor 24 detects the angular velocity of the electronic device 1. The controller 11 can measure the orientation of the electronic device 1 by integrating the angular velocity, acquired by the gyro sensor 24, over time once.

Gesture-Based Operation of Electronic Device

Figure 2A:
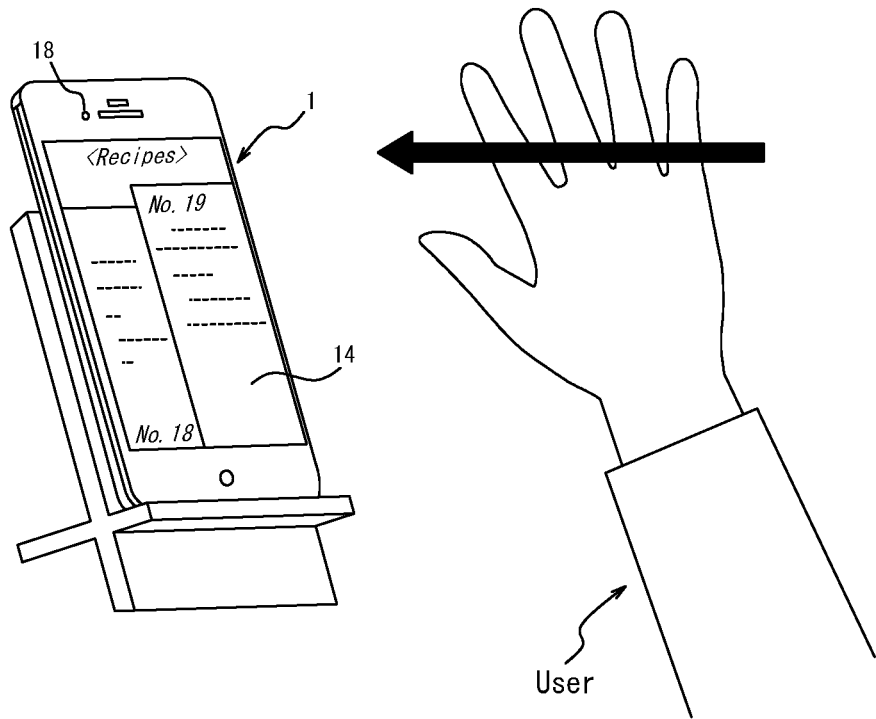
FIG. 2A and FIG. 2B illustrate a user operating an electronic device with a gesture.
Figure 2B:
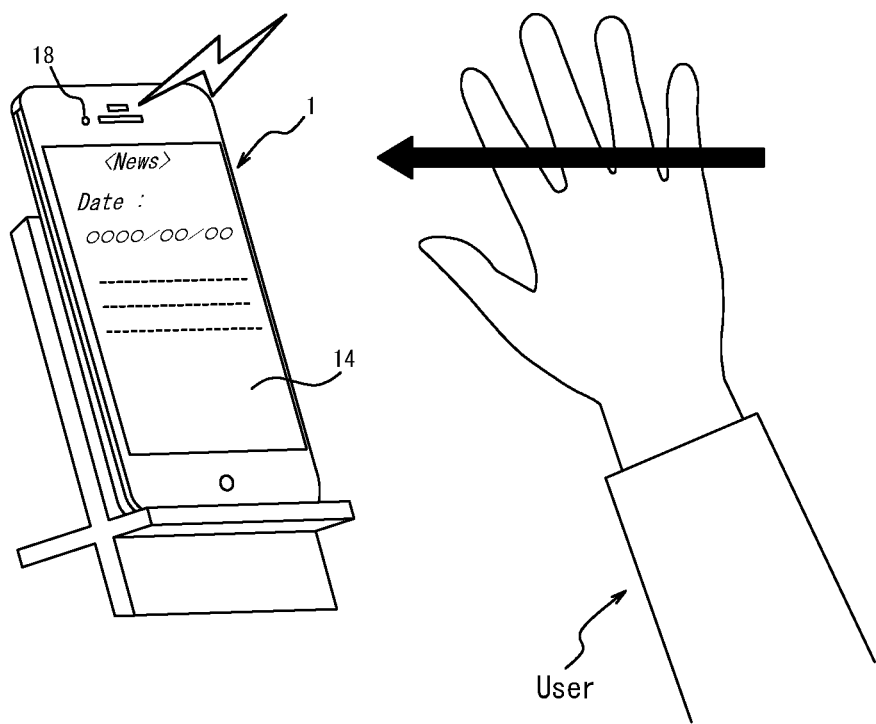

FIGS. 2A and 2B illustrate the user operating the electronic device 1 with a gesture. In FIGS. 2A and 2B, the electronic device 1 is supported by a stand as an example. Alternatively, the electronic device 1 may be leaned against a wall or placed on a table. Upon the proximity sensor 18 detecting a gesture by the user, the controller 11 executes processing based on the detected gesture. In the example illustrated in FIG. 2A, the gesture-based processing is selection of a recipe. For example, when the user makes a gesture by moving a hand from right to left in the transverse direction of the display 14 (in the direction of the arrow in FIG. 2A), the recipe displayed on the display 14 changes. In the example illustrated in FIG. 2B, the gesture-based processing is reading news displayed on the display 14 aloud. For example, when the user makes a gesture by moving a hand from right to left in the transverse direction of the display 14 (in the direction of the arrow in FIG. 2B), the news is outputted as sound from the speaker 25.

The electronic device 1 in FIG. 2A and FIG. 2B is a smartphone. Alternatively, the electronic device 1 may, for example, be a mobile phone, a phablet, a tablet PC, a feature phone, or other such device. The electronic device 1 is not limited to these examples and may, for example, also be a personal digital assistant (PDA), a remote control, a portable music player, a game device, an electronic book reader, a car navigation device, a household appliance, an industrial device (factory automation (FA) device), or the like.

Figure 3:
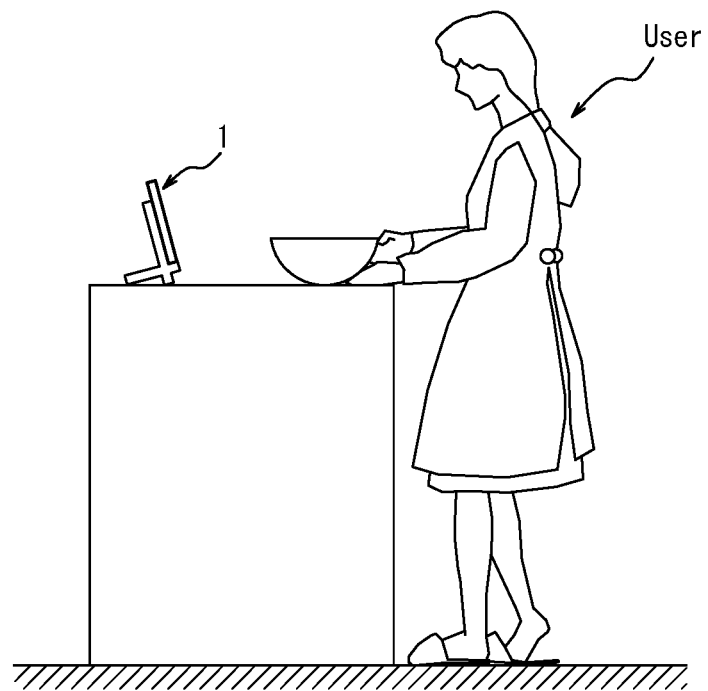
FIG. 3 illustrates example conditions in which the user operates an electronic device with a gesture.

FIG. 3 illustrates example conditions in which the user operates the electronic device 1 with a gesture. In the example in FIG. 3, the user is cooking in the kitchen by following a cooking recipe displayed on the display 14 of the electronic device 1. As mentioned above, the proximity sensor 18 detects a gesture by the user. The controller 11 executes processing based on the gesture detected by the proximity sensor 18. The controller 11 can execute processing to scroll the recipe in response to a particular gesture (such as the user raising or lowering a hand). The user's hand may become dirty or wet during cooking. The user can scroll the recipe with a particular gesture, however, without touching the electronic device 1. The display 14 therefore does not become dirty, and dirt on the display 14 can be prevented from getting on the user's hand during cooking.

The electronic device 1 has a plurality of modes. Modes refer to operation modes (operating states or operation statuses) that, for example, place restrictions on the operations of the entire electronic device 1. Only one mode can be selected at a time. In the present embodiment, the modes of the electronic device 1 include a first mode and a second mode. The second mode is an operation mode (kitchen mode) of the electronic device 1 that is optimal for cooking in the kitchen while a recipe is displayed. When in the second mode, the electronic device 1 can operate the proximity sensor 18 and detect gestures. The electronic device 1 also operates the microphone 15 when in the second mode. The electronic device 1 can then receive audio input using the microphone 15 instead of character input (from a touch panel operation by the user). The first mode is a regular operation mode (regular mode) appropriate for use in rooms other than the kitchen or outside of the home, for example. In the present embodiment, the user sets the electronic device 1 to the second mode (kitchen mode) when cooking in the kitchen. The mode may be easily settable via a notification (notification screen) that appears upon, for example, swiping the edge of the screen.

Here, it is assumed that the user has set the electronic device 1 to the second mode (kitchen mode) via a notification, for example, and is cooking in the kitchen. While cooking, the user may need to perform an action other than cooking depending on notification information provided to the user. The notification information includes, for example, information received by the communication interface 17 (such as an email or chat message). When, for example, the notification information indicates that a family member is returning home, the user may wish to send a shopping request to the family member. If the user operates the electronic device 1 by touch at this time, the display 14 may get dirty, and dirt on the display 14 may get on the user's hand during cooking. The notification information may, for example, include information displayed on the display 14 (such as a schedule or time display). For example, if the notification information indicates that it is time to pick up a child from daycare, the user may wish to communicate that she will be slightly late. If the user operates the electronic device 1 by touch at this time, the display 14 may get dirty, and dirt on the display 14 may get on the user's hand during cooking.

The electronic device 1 of the present embodiment can switch gesture-based processing in accordance with the content of notification information. Therefore, even if a user who is cooking needs to perform an action other than cooking, the user can operate the electronic device 1 without touching the electronic device 1, i.e. by gesture.

Gesture Group Information

FIG. 4 illustrates an example of gesture group information 111 stored in the storage 16. With the gesture group information 111, the storage 16 links and stores keywords with types of gestures detected by the proximity sensor 18. In the present embodiment, the gesture group information 111 is a table in which keywords and gesture-based processing linked to the keywords are associated and divided into groups. The gesture group information 111 is read by the controller 11 from the storage 16 and is used for the controller 11 to select the group associated with a keyword, for example.

In the present embodiment, the gesture group information 111 includes the items "group number", "keyword", "notification information type", "priority", and "gesture-based processing". The "gesture-based processing" in the example in FIG. 4 includes "up-down movement", "left-right movement", "trace a triangle", and "trace a rectangle" as the types of gestures.

The "group number" is a unique number of the group of gestures associated with a keyword. In the example in FIG. 4, one row of the table corresponds to one group. Group numbers from 1 to 5 are illustrated in the example in FIG. 4, but more than five groups may be included in the gesture group information 111. It suffices for at least one group to be included. Hereinafter, group N (where N is an integer) refers to the group whose group number is N.

The "keyword" is a keyword that the controller 11 detects from the notification information. The controller 11 acquires the notification information. When a keyword is included in the notification information, the controller 11 executes at least one of processing corresponding to the keyword and display on the display 14. In the present embodiment, each group has one or more keywords.

The "notification information type" indicates the type of notification information from which the controller 11 detects keywords. Particular keywords are associated with particular types of notification information. In the example of group 1 in FIG. 4, the controller 11 detects the keyword "going home" when the notification information is a "message (such as an email or chat message)" received by the communication interface 17.

The "priority" is a value for the controller 11 to determine whether to prioritize the processing for the corresponding group over the default state in the second mode (the recipe display state in the present embodiment). In greater detail, the controller 11 compares the priority of the group with a reference priority to determine which processing to execute. The reference priority is a reference value (threshold) used to judge whether to execute processing. When the priority is equal to or greater than the reference priority, the processing of the group having that priority is executed. Suppose that the reference priority is 2, for example. In this case, the gesture-based processing of group 1 is executed when the keyword "going home" is detected in the notification information, since the priority of group 1, i.e. 3, is equal to or greater than the reference priority. As another example, suppose that the reference priority is 4. Since the priority of group 1 is less than the reference priority in this case, gesture-based processing for the default state in the second mode (the recipe display state) is executed. Here, the reference priority may be set by the user. For example, the reference priority may be settable via a notification (notification screen).

The "gesture-based processing" indicates the processing, for each group, executed based on the type of gesture detected by the proximity sensor 18 (i.e. the processing corresponding to the detected keyword). In the default state in the second mode (the recipe display state in the present embodiment), the controller 11 scrolls the screen displayed on the display 14 when an up-down gesture is detected. The controller 11 executes recipe selection processing when a left-right gesture is detected. If the controller 11 has selected group 1, for example, the controller 11 displays the route home when an up-down gesture is detected. If the controller 11 has selected group 1, for example, the controller 11 executes processing for a shopping request when a left-right gesture is detected (such as processing to transmit a shopping list to a family member who is on the way home). The controller 11 executes gesture-based processing of the selected group in this way.

Details on the groups in FIG. 4 are provided below. The keyword for group 1 is "going home". The controller 11 detects (searches for) the keyword "going home" when the notification information type is "message". The controller 11 selects group 1 when the keyword is detected from the notification information and the priority "3" is equal to or greater than the reference priority. The controller 11 then executes gesture-based processing included in group 1. The controller 11 displays the route home when the proximity sensor 18 detects an up-down gesture, for example. The controller 11 executes processing for a shopping request when the proximity sensor 18 detects a left-right gesture, for example. The controller 11 cancels the immediately prior selection by the user (such as a shopping request) when the proximity sensor 18 detects a gesture to trace a triangle. The controller 11 returns to the recipe display, which is default processing, when the proximity sensor 18 detects a gesture to trace a rectangle.

The keyword for group 2 is "17:40". The time "17:40" is the time to pick up a child from daycare. The controller 11 detects the keyword "17:40" when the notification information type is "current time" (for example, when a scheduling application notifies the user of the current time). The controller 11 selects group 2 when the current time is 17:40 and the priority "5" is equal to or greater than the reference priority. The controller 11 then executes gesture-based processing included in group 2. The controller 11 displays the route to the daycare center when the proximity sensor 18 detects an up-down gesture, for example. The controller 11 executes processing to contact the daycare center (for example, to place a telephone call to the daycare center) when the proximity sensor 18 detects a left-right gesture, for example. The cases of the proximity sensor 18 detecting a gesture to trace a triangle or a rectangle are the same as for group 1. Hence, a description is omitted.

The keyword for group 3 is "8000". The number "8000" is the daily target number of steps set by the user. The controller 11 detects the keyword "8000" when the notification information type is "number of steps" (for example, when a pedometer application notifies the user of the current number of steps). The controller 11 selects group 3 when "8000" steps is included in an achievement notification of the target number of steps and the priority "1" is equal to or greater than the reference priority. The controller 11 then executes gesture-based processing included in group 3. The controller 11 launches the pedometer application in the foreground when the proximity sensor 18 detects an up-down gesture, for example. The controller 11 displays calorie consumption calculated by the pedometer application when the proximity sensor 18 detects a left-right gesture, for example. The cases of the proximity sensor 18 detecting a gesture to trace a triangle or a rectangle are the same as for group 1. Hence, a description is omitted.

The keywords for group 4 are "breaking" and "extra". The terms "breaking" and "extra" are keywords suggesting that news content is special. The controller 11 judges whether the keyword "breaking" or "extra" is included when the notification information type is "news" (for example, when a notification of news is received from a news site). The controller 11 selects group 4 when the keyword "breaking" or "extra" is included in the news and the priority "2" is equal to or greater than the reference priority. The controller 11 then executes gesture-based processing included in group 4. The controller 11 displays the body of the "breaking" or "extra" news when the proximity sensor 18 detects an up-down gesture, for example. The controller 11 executes processing to read aloud the body of the "breaking" or "extra" news when the proximity sensor 18 detects a left-right gesture, for example. The cases of the proximity sensor 18 detecting a gesture to trace a triangle or a rectangle are the same as for group 1. Hence, a description is omitted.

The keywords for group 5 are "watch" and "warning". The controller 11 judges whether the keyword "watch" or "warning" is included when the notification information type is "weather forecast" (for example, when notification of the weather forecast is received from a weather site). The controller 11 selects group 5 when "watch" or "warning" is included in the weather forecast and the priority "4" is equal to or greater than the reference priority. The controller 11 then executes gesture-based processing included in group 5. The controller 11 displays the weather forecast when the proximity sensor 18 detects an up-down gesture, for example. The controller 11 executes processing to read the weather forecast aloud when the proximity sensor 18 detects a left-right gesture, for example. The cases of the proximity sensor 18 detecting a gesture to trace a triangle or a rectangle are the same as for group 1. Hence, a description is omitted.

When conditions for selecting two groups are satisfied simultaneously, the controller 11 executes gesture-based processing in descending order of priority. For example, suppose that the controller 11 detects the keyword "going home" in a "message" and simultaneously detects the keyword "8000" in a notification of the current number of steps. Further suppose that the reference priority is set to 1. Although conditions for selecting groups 1 and 3 are satisfied at this time, the controller 11 executes gesture-based processing in order starting with group 1, which has higher priority. The controller 11 then executes gesture-based processing of group 3 after the processing for group 1 is complete. Alternatively, when conditions for selecting two groups are satisfied simultaneously, the controller 11 may execute gesture-based processing only for the group with higher priority.

Flowchart

FIG. 5 is a flowchart illustrating an example of gesture-based processing executed by the controller 11 of the electronic device 1 according to the present embodiment.

The controller 11 acquires notification information (step S1). The notification information is information of which the user is notified. As described above, the notification information may be information (such as a message) acquired through the communication interface 17 from a mobile terminal of a different user than the user of the electronic device 1. The notification information may also be information (such as news or a weather forecast) acquired through the communication interface 17 from a server of an information site different from the electronic device 1. The notification information may also be information (such as notification of the current time or the current number of steps) from an application executed by the electronic device 1 (such as a scheduling application or a pedometer application).

The controller 11 judges whether a keyword is included in the notification information (step S2). A keyword is a word, a symbol, a number, a combination thereof, or the like that, by being included in particular notification information, suggests the occurrence of a different event than the event the user is currently executing (cooking in the present embodiment). In the present embodiment, "going home", "17:40", "8000", "breaking", "extra", "watch", "warning", and the like are used as keywords. When a keyword is not included in the notification information (step S2: No), the controller 11 returns to step S1 and acquires the next notification information. When a keyword is included in the notification information (step S2: Yes), the controller 11 proceeds to step S3.

The controller 11 executes at least one of processing corresponding to the keyword and display (step S3). For example, when the keyword "going home" is included in "message" notification information, the controller 11 executes processing to calculate the route home on the basis of global positioning system (GPS) information, for the mobile terminal carried by the family member returning home, and house position information. The controller 11 then causes an estimated return time to be displayed on the display 14. The estimated return time may be displayed at the edge of the display 14 along with the current time. Instead of the estimated return time, the time until returning home may be counted down. When the keyword "17:40" (pickup time) is included in the "current time" notification information, the controller 11 may, for example, cause the elapsed time from "17:40" to be displayed in addition to the current time on the display 14.

The controller 11 determines whether the mode of the electronic device 1 is the second mode (kitchen mode) (step S4). When the mode is the first mode (regular mode), i.e. not the second mode (kitchen mode) (step S4: No), the controller 11 ends the processing sequence. The user's hand is not dirty or wet at this time, since the user is not cooking. The user can therefore respond to the notification information by operating the electronic device 1 by touch.

When the mode of the electronic device 1 is the second mode (kitchen mode) (step S4: Yes), the controller 11 proceeds to step S5.

The controller 11 judges whether the priority associated with the keyword is equal to or greater than the reference priority (step S5). When the priority associated with the keyword is less than the reference priority (step S5: No), the controller 11 ends the processing sequence. For example, the priority of group 3 is "1" in the example in FIG. 4. If the reference priority is set to "3", the controller 11 ends the processing sequence without selecting group 3, because the priority is less than the reference priority.

When the priority associated with the keyword is equal to or greater than the reference priority (step S5: Yes), the controller 11 selects the group of gestures associated with the keyword (step S6).

The controller 11 stands by until a gesture is detected (step S7: No). When a gesture is detected (step S7: Yes), the controller 11 executes gesture-based processing included in the selected group (step S8). The controller 11 then ends the processing sequence. For example, suppose the controller 11 detects the keyword "going home" in a "message" and selects group 1 of FIG. 4. The controller 11 causes the route home to be displayed when a gesture in which the hand is moved down from above is detected at this time. The controller 11 executes processing for a shopping request when a gesture in which the hand is moved right to left is detected. When the processing for a shopping request is executed, the screen displayed on the display 14 may change to a screen for determining items to purchase, for example. On this screen for determining items to purchase, items may be selectable by a pointing gesture, or items that the user inputs by voice may be converted to text to create a message for the family member returning home.

As described above, the electronic device 1 according to the present embodiment detects a keyword from notification information and executes processing based on the type of gesture (such as up-down movement) linked to the keyword. In other words, the electronic device 1 recognizes, from the keyword of the notification information (such as "going home"), that a different event (such as a family member returning home) than the event currently being executed by the user (cooking in the present embodiment) has occurred. The electronic device 1 can then execute processing appropriate for the different event on the basis of a gesture. The electronic device 1 according to the present embodiment therefore does not suspend gesture-based input operations (hands-free operations) even when a different event occurs. The electronic device 1 according to the present embodiment enables various operations in accordance with a variety of conditions to be performed consistently with gestures and therefore has improved operability.

Other Embodiments

Although the subject matter of the present disclosure has been described with reference to the drawings and embodiments, it is to be noted that various changes and modifications will be apparent to those skilled in the art on the basis of the present disclosure. Therefore, such changes and modifications are to be understood as included within the scope of the present disclosure. For example, the functions and the like included in the various components, steps, and the like may be reordered in any logically consistent way. Furthermore, components, steps, and the like may be combined into one or divided.

In the above embodiment, the electronic device 1 is set to the second mode (kitchen mode) by user operation via a notification (notification screen). The controller 11 may set the electronic device 1 to the second mode automatically when a condition is satisfied. For example, the controller 11 judges that a first condition is satisfied when an application displaying a recipe is being executed, or when a recipe site is being viewed. The controller 11 may set the electronic device 1 to the second mode when judging that the first condition is satisfied and that a recipe is not currently being selected (for example, when the recipe is not changed for a certain length of time, such as 30 seconds). The controller 11 may set the electronic device 1 to the second mode when judging that the first condition is satisfied and that the user has not operated the touch panel for at least a certain length of time (such as one minute). The controller 11 may set the electronic device 1 to the second mode when the first condition is satisfied and the electronic device 1 has not changed position for at least a certain length of time (such as one minute).

When notification information is information from the mobile terminal of another user, the electronic device 1 of the above embodiment executes processing to analyze the notification information and calculate the route home, for example. The electronic device 1 may, however, acquire a processing result based on the notification information when the notification information is information from the mobile terminal of another user. For example, when the keyword "going home" is included in notification information that is a "message", the electronic device 1 may acquire the route home, calculated by the mobile terminal of the family member who is returning home, via the communication interface 17. In other words, when the notification information is information from the mobile terminal of another user, the mobile terminal of the other user may be caused to execute a portion of processing executed by the electronic device 1 of the above embodiment, thereby reducing the processing load of the electronic device 1. The electronic device 1 may also cause the mobile terminal of the family member who is returning home to detect words such as "I'm leaving" or "see you tomorrow" from the family member's speech. The electronic device 1 may then cause the mobile terminal of the family member for whom such words were detected to transmit GPS information or the like.

The electronic device 1 of the above embodiment executes gesture-based processing included in the selected group and then ends the processing. When the gesture-based processing includes transmission to another mobile terminal, the electronic device 1 may end the processing after being contacted by the other mobile terminal. For example, in the case of requesting that the returning family member go shopping, the electronic device 1 may transmit the shopping list to the mobile terminal of the family member and then acquire, via the communication interface 17, a signal indicating that the returning family member has confirmed the list. The electronic device 1 can achieve more reliable communication by executing processing to confirm transmission and receipt to and from the mobile terminal of the other user.

The electronic device 1 of the above embodiment displays a screen for the user to select items to purchase when creating a shopping list for the mobile terminal of the family member returning home. The electronic device 1 may allow the user to select processing. For example, when the controller 11 selects group 3 in FIG. 4, and the proximity sensor 18 detects a left-right gesture, a screen on which the user can select "launch application" or "display calorie consumption" may be displayed. The user may then be able to select between these types of processing with an upward gesture or a downward gesture. In other words, the electronic device 1 may allow user selection in stages all the way to the final determination of processing. This allows the final determination of processing to be made from among more choices.

The priority is set for each group in the above embodiment. The priority may instead be set for each keyword. For example, group 5 in FIG. 4 includes two keywords, "watch" and "warning". The priority of these keywords may be set to 4 for the "warning", in which the user is more interested, and to 2 for the "watch".

Much of the subject matter of the present disclosure is described as a series of operations executed by a computer system and other hardware that can execute program instructions. Examples of the computer system and other hardware include a general-purpose computer, a personal computer (PC), a dedicated computer, a workstation, a personal communications system (PCS), a mobile (cellular) phone, a mobile phone with a data processing function, an RFID receiver, a game device, an electronic notepad, a laptop computer, a GPS receiver, and other programmable data processing apparatuses. It should be noted that in each embodiment, various operations or control methods are executed by a dedicated circuit (for example, individual logical gates interconnected in order to execute a particular function) implemented by program instructions (software), or by a logical block and/or program module or the like executed by one or more processors. The one or more processors that execute a logical block, program module, or the like include, for example, one or more of a microprocessor, CPU, application specific integrated circuit (ASIC), digital signal processor (DSP), programmable logic device (PLD), field programmable gate array (FPGA), processor, controller, microcontroller, microprocessor, electronic device, other apparatus designed to be capable of executing the functions disclosed here, and/or a combination of any of the above. The embodiments disclosed here are, for example, implemented by hardware, software, firmware, middleware, microcode, or a combination of any of these. The instructions may be program code or a code segment for executing the necessary tasks. The instructions may be stored on a machine-readable, non-transitory storage medium or other medium. The code segment may indicate a combination of any of the following: procedures, functions, subprograms, programs, routines, subroutines, modules, software packages, classes, instructions, data structures, or program statements. The code segment may transmit and/or receive information, data arguments, variables, or memory content to or from another code segment or hardware circuit in order for the code segment to connect to another code segment or hardware circuit.

The storage 16 used here may also be configured as a computer-readable, tangible carrier (medium) in any of the categories of solid-state memory, magnetic disks, and optical discs. Data structures or an appropriate set of computer instructions, such as program modules, for causing a processor to execute the techniques disclosed herein are stored on these media. Examples of computer-readable media include an electrical connection with one or more wires, a magnetic disk storage medium, a magnetic cassette, a magnetic tape, or other magnetic or optical storage medium, such as a compact disc (CD), laser disc®, digital versatile disc (DVD®), floppy® disk, and Blu-ray disc® (laser disc, DVD, floppy, and Blu-ray disc are registered trademarks in Japan, other countries, or both). Further examples include a portable computer disk, random access memory (RAM), read-only memory (ROM), rewritable programmable ROM such as erasable programmable read-only memory (EPROM), electrically erasable programmable read-only memory (EEPROM), or flash memory, another tangible storage medium that can store information, or a combination of any of these. The memory may be provided internal and/or external to a processor or processing unit. As used in the present disclosure, the term "memory" refers to all types of long-term storage, short-term storage, and volatile, nonvolatile, or other memory. In other words, the "memory" is not limited to a particular type or number. The type of medium on which information is stored is not limited, either.

REFERENCE SIGNS LIST

1 Electronic device
11 Controller
12 Timer
13 Camera
14 Display
15 Microphone
16 Storage
17 Communication interface
18 Proximity sensor
19 UV sensor
20 Illuminance sensor
21 Acceleration sensor
22 Geomagnetic sensor
23 Barometric pressure sensor
24 Gyro sensor
25 Speaker
111 Gesture group information

The invention claimed is:

1. An electronic device comprising:
a proximity sensor configured to detect a gesture by a user;
a controller configured to execute a predetermined processing based on the gesture detected by the proximity sensor; and
a storage configured to link and store a predetermined keyword included in notification information provided to the user with the predetermined processing executed based on the gesture detected by the proximity sensor, wherein the controller is configured to execute the predetermined processing linked to the predetermined keyword in response to the gesture detected by the proximity sensor, when the predetermined keyword is included in the notification information.

2. The electronic device of claim 1, further comprising:
a communication interface;
wherein the notification information is received by the communication interface.

3. The electronic device of claim 1, further comprising:
a display;
wherein the notification information is displayed on the display.

4. The electronic device of claim 1, wherein the notification information is received from an application executed by the electronic device.

5. The electronic device of claim 1, wherein the storage is configured to link and store a notification information type to the keyword.

6. The electronic device of claim 1, wherein the storage is configured to link and store a priority to the keyword.

7. The electronic device of claim 1, wherein
the storage is further configured to link and store the keyword with a notification information type, and
the controller detects the keyword from the notification information with the notification information being the same type as the linked and stored notification information type.

8. The electronic device of claim 1, wherein the controller is configured to change the predetermined processing executed in response to the gesture detected by the proximity sensor, based on the keyword included in the notification information.

9. The electronic device of claim 1, wherein the controller is configured to execute the predetermined processing linked to the predetermined keyword if a priority associated with the keyword is equal to or greater than a reference priority.

10. A non-transitory computer-readable recording medium that stores a control program for an electronic device comprising a proximity sensor and a storage, the control program configured to execute processes of:
detecting a gesture by a user through the proximity sensor;
executing a predetermined processing based on the gesture detected by the proximity sensor; and
linking and storing, in the storage, a predetermined keyword included in notification information provided to the user with the predetermined processing executed based on the gesture detected by the proximity sensor, wherein
the predetermined processing linked to the predetermined keyword is executed in response to the gesture detected by the proximity sensor, when the predetermined keyword is included in the notification information.

11. The non-transitory computer-readable recording medium of claim 10, wherein the control program is further configured to execute processes of:
linking and storing, in the storage, the keyword with a notification information type, wherein
the control program detects the keyword from the notification information with the notification information being the same type as the linked and stored notification information type.

12. The non-transitory computer-readable recording medium of claim 10, wherein the predetermined processing executed in response to the gesture detected by the proximity sensor is changed based on the keyword included in the notification information.

13. The non-transitory computer-readable recording medium of of claim 10, wherein the predetermined processing linked to the predetermined keyword is executed if a priority associated with the keyword is equal to or greater than a reference priority.

14. A control method of an electronic device comprising a proximity sensor and a storage, the control method comprising:
detecting a gesture by a user through the proximity sensor;
executing a predetermined processing based on the gesture detected by the proximity sensor; and
linking and storing, in the storage, a predetermined keyword included in notification information provided to the user with the predetermined processing executed based on the gesture detected by the proximity sensor, wherein
the predetermined processing linked to the predetermined keyword is executed in response to the gesture detected by the proximity sensor, when the predetermined keyword is included in the notification information.

15. The control method of claim 14, further comprising:
receiving the notification information from a communication interface of the electronic device.

16. The control method of claim 14, further comprising:
receiving the notification information from an application executed by the electronic device.

17. The control method of claim 14, further comprising:
linking a priority to the keyword.

18. The control method of claim 14, wherein the predetermined processing executed in response to the gesture detected by the proximity sensor is changed based on the keyword included in the notification information.

19. The control method of claim 14, wherein the predetermined processing linked to the predetermined keyword is executed if a priority associated with the keyword is equal to or greater than a reference priority.

* * * * *